United States Patent
Prosser et al.

[11] Patent Number: 5,884,659
[45] Date of Patent: Mar. 23, 1999

[54] PORTABLE TUBELESS TIRE INFLATING SYSTEM

[76] Inventors: General M. Prosser, 1856 Philadelphia St., Darlington, S.C. 29532; Leo J. Ard, 1602 Ard St., Florence, S.C. 29505

[21] Appl. No.: 717,246

[22] Filed: Sep. 23, 1996

[51] Int. Cl.[6] .................................................. B60C 25/02
[52] U.S. Cl. .................... 137/587; 137/227; 137/223; 157/1.1
[58] Field of Search .................... 137/223, 227, 137/587, 899.4, 228; 152/415; 157/1.1

[56] References Cited

U.S. PATENT DOCUMENTS

| | | | |
|---|---|---|---|
| 691,747 | 1/1902 | Champ | 137/227 X |
| 1,427,450 | 8/1922 | Ewald | 137/223 |
| 2,804,259 | 8/1957 | Ralston | 137/899.4 |
| 3,552,469 | 1/1971 | Corless | 157/1.1 |
| 3,866,654 | 2/1975 | Duquesne | 137/223 X |
| 4,969,493 | 11/1990 | Lee | 137/227 X |
| 5,072,764 | 12/1991 | Ochoa | 157/1.1 |
| 5,131,275 | 7/1992 | Huang | 137/228 X |
| 5,399,072 | 3/1995 | Westphal | 417/234 |

*Primary Examiner*—John Rivell
*Assistant Examiner*—Meredith Schoenfeld

[57] ABSTRACT

A new Portable Tubeless Tire Inflating System for forcing a large volume of air into a tubeless tire which presses the side-walls of the tire against the rim, thereby setting a bead so the user may fully inflate the tire using a conventional valve stem. The inventive device includes a conventional portable air tank and an air releasing means attached to the conventional portable air tank providing a burst of air to a tire during mounting.

1 Claim, 3 Drawing Sheets

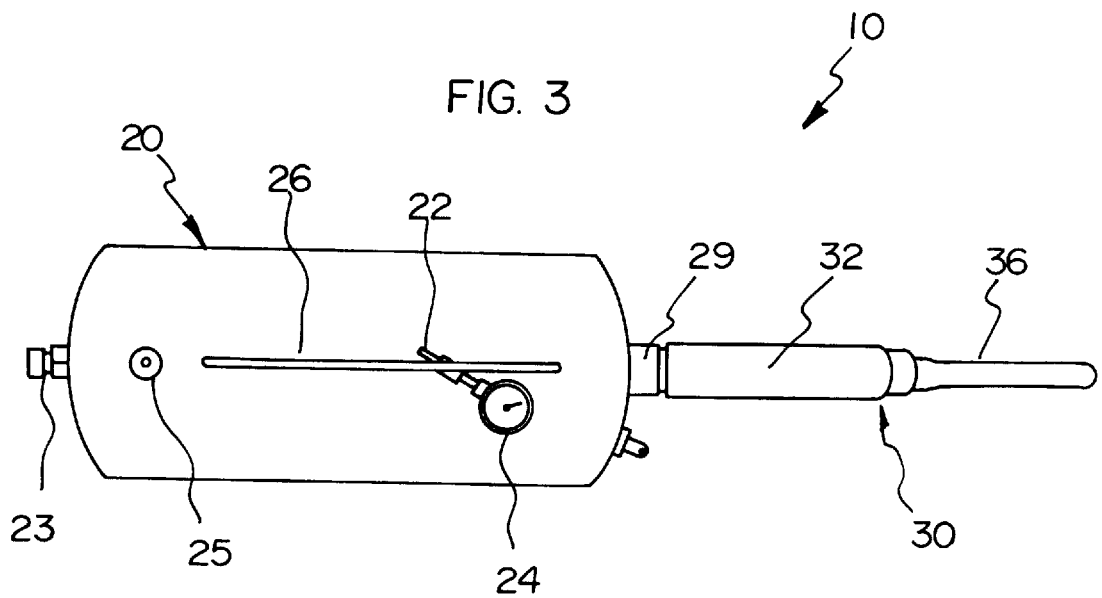
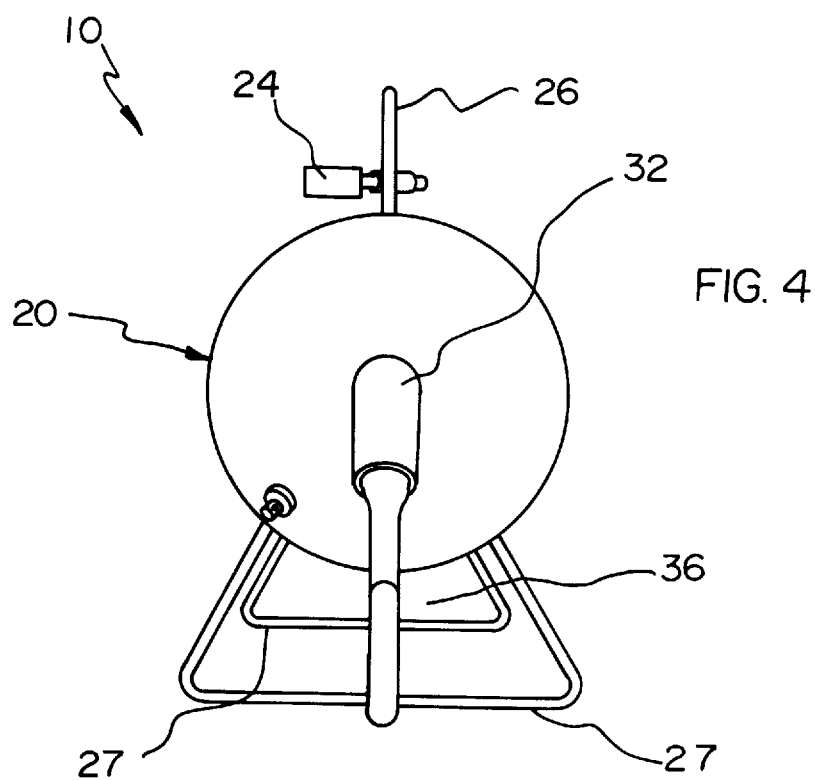

PORTABLE TUBELESS TIRE INFLATING SYSTEM

BACKGROUND OF THE INVENTION

1. Field of the Invention

The present invention relates to Tire Inflating Devices and more particularly pertains to a new Portable Tubeless Tire Inflating System for forcing a large volume of air into a tubeless tire which presses the side-walls of the tire against the rim, thereby setting bead so the user may fully inflate the tire using a conventional valve stem.

2. Description of the Prior Art

The use of Tire Inflating Devices is known in the prior art. More specifically, Tire Inflating Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Tire Inflating Devices include U.S. Pat. No. 5,072,764; U.S. Pat. No. 5,399,072; U.S. Pat. No. 5,247,982; U.S. Design Pat. No. 278,244; U.S. Pat. No. 5,042,547; U.S. Pat. No. 5,141,040 and U.S. Pat. No. 4,735,250.

While these devices fulfill their respective particular objectives and requirements, the aforementioned patents do not disclose a new Portable Tubeless Tire Inflating System. The inventive device includes a conventional portable air tank and an air releasing means attached to the conventional portable air tank providing a burst of air to a tire during mounting.

In these respects, the Portable Tubeless Tire Inflating System according to the present invention substantially departs from the conventional concepts and designs of the prior art, and in so doing provides an apparatus primarily developed for the purpose of forcing a large volume of air into a tubeless tire which presses the side-walls of the tire against the rim, thereby setting a bead so the user may fully inflate the tire using a conventional valve stem.

SUMMARY OF THE INVENTION

In view of the foregoing disadvantages inherent in the known types of Tire Inflating Devices now present in the prior art, the present invention provides a new Portable Tubeless Tire Inflating System construction wherein the same can be utilized for forcing a large volume of air into a tubeless tire which presses the side-walls of the tire against the rim, thereby setting a bead so the user may fully inflate the tire using a conventional valve stem.

The general purpose of the present invention, which will be described subsequently in greater detail, is to provide a new Portable Tubeless Tire Inflating System apparatus and method which has many of the advantages of the Tire Inflating Devices mentioned heretofore and many novel features that result in a new Portable Tubeless Tire Inflating System which is not anticipated, rendered obvious, suggested, or even implied by any of the prior art Tire Inflating Devices, either alone or in any combination thereof.

To attain this, the present invention generally comprises a conventional portable air tank and an air releasing means attached to the conventional portable air tank providing a burst of air to a tire during mounting.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Portable Tubeless Tire Inflating System apparatus and method which has many of the advantages of the Tire Inflating Devices mentioned heretofore and many novel features that result in a new Portable Tubeless Tire Inflating System which is not anticipated, rendered obvious, suggested, or even implied by any of the prior art Tire Inflating Devices, either alone or in any combination thereof.

It is another object of the present invention to provide a new Portable Tubeless Tire Inflating System which may be easily and efficiently manufactured and marketed.

It is a further object of the present invention to provide a new Portable Tubeless Tire Inflating System which is of a durable and reliable construction.

As even further object of the present invention is to provide a new Portable Tubeless Tire Inflating System which is susceptible of a low cost of manufacture with regard to both materials and labor, and which accordingly is then susceptible of low prices of sale to the consuming public, thereby making such Portable Tubeless Tire Inflating System economically available to the buying public.

Still yet another object of the present invention is to provide a new Portable Tubeless Tire Inflating System which provides in the apparatuses and methods of the prior art some of the advantages thereof, while simultaneously overcoming some of the disadvantages normally associated therewith.

Still another object of the present invention is to provide a new Portable Tubeless Tire Inflating System for forcing a large volume of air into a tubeless tire which presses the side-walls of the tire against the rim, thereby setting a bead so the user may fully inflate the tire using a conventional valve stem.

Yet another object of the present invention is to provide a new Portable Tubeless Tire Inflating System which includes a conventional portable air tank and an air releasing means attached to the conventional portable air tank providing a burst of air to a tire during mounting.

Still yet another object of the present invention is to provide a new Portable Tubeless Tire Inflating System that is portable.

Even still another object of the present invention is to provide a new Portable Tubeless Tire Inflating System that produces a short burst of air to expand a tire setting the bead during mounting of the tire to a rim.

Still yet another object of the present invention is to provide a new Portable Tubeless Tire Inflating System that is able to seat a tire to a rim by a single person in a remote area.

Yet another object of the present invention is to provide a new Portable Tubeless Tire Inflating System that is able to set the bead on a large truck tire with highly pressurized air.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an top view of the present invention disclosing the pressure gauge in relation to the handle.

FIG. 4 is a front view of the invention displaying the planar air outlet port secured to the release valve.

DESCRIPTION OF THE PREFERRED EMBODIMENT

Figure 1:
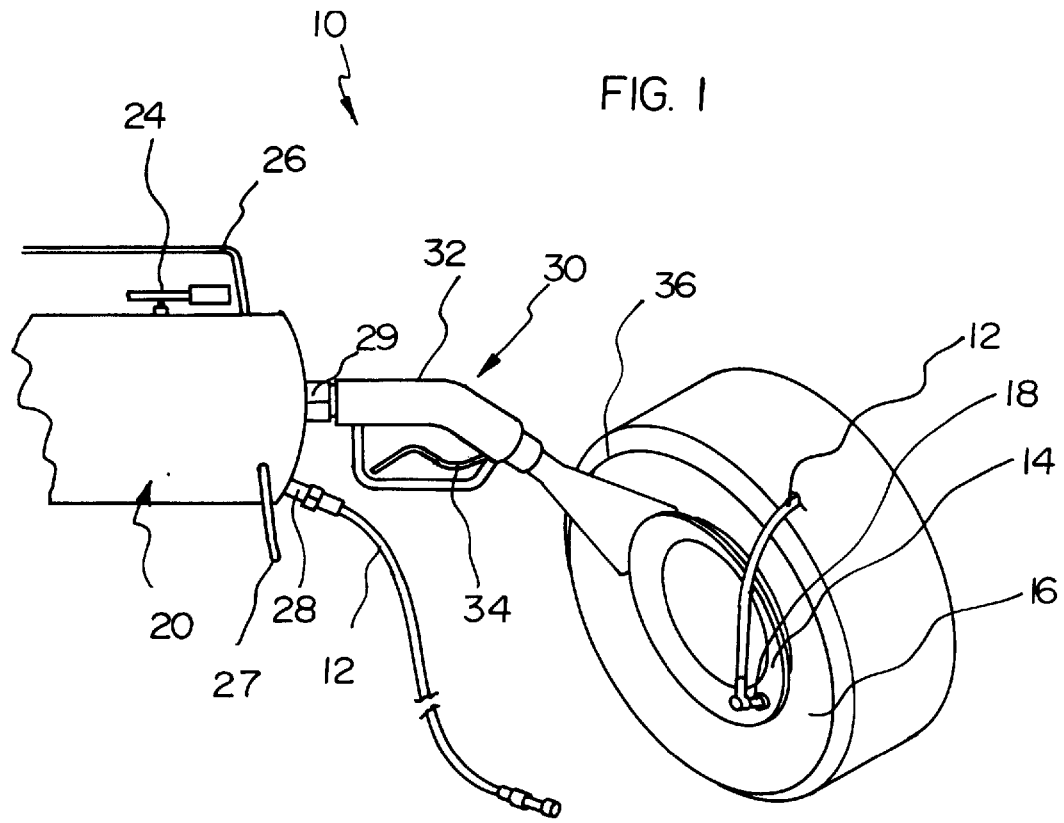
FIG. 1 is a side perspective view of a new Portable Tubeless Tire Inflating System engaging a tire and a rim according to the present invention.

With reference now to the drawings, and in particular to FIGS. 1 through 6 thereof, a new Portable Tubeless Tire Inflating System embodying the principles and concepts of the present invention and generally designated by the reference numeral 10 will be described.

More specifically, it will be noted that the Portable Tubeless Tire Inflating System 10 comprises a conventional portable air tank 20 and an air releasing means 30.

Figure 2:
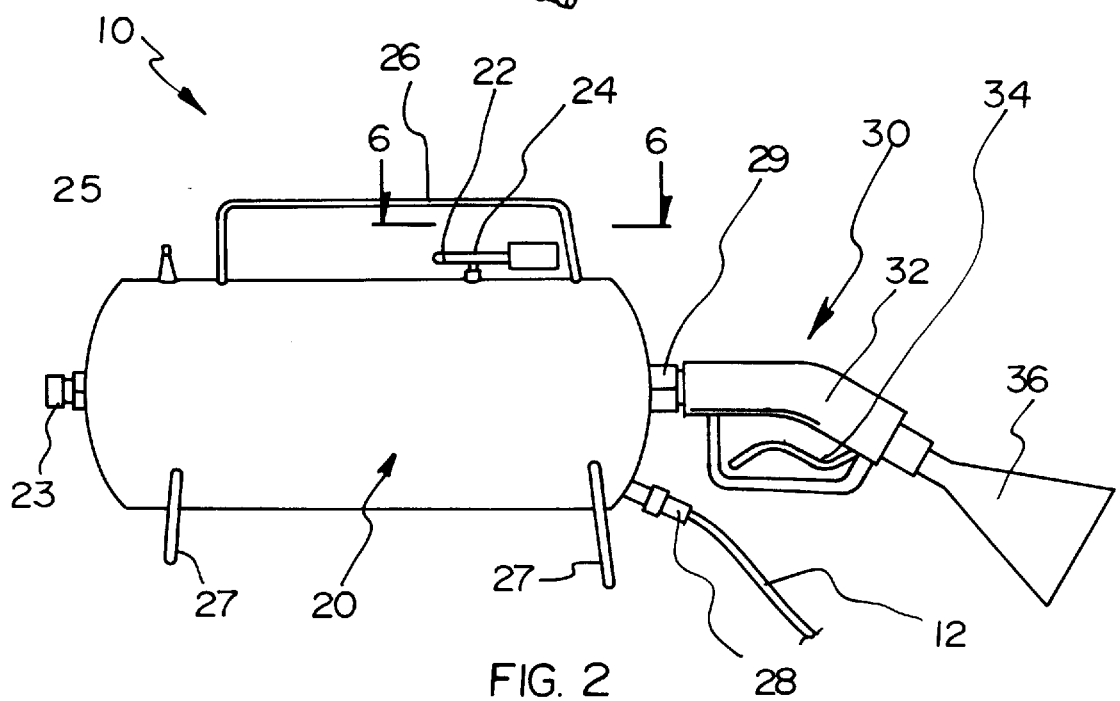
FIG. 2 is a side view disclosing the air releasing means in cooperation with the conventional portable air tank.
Figure 5:
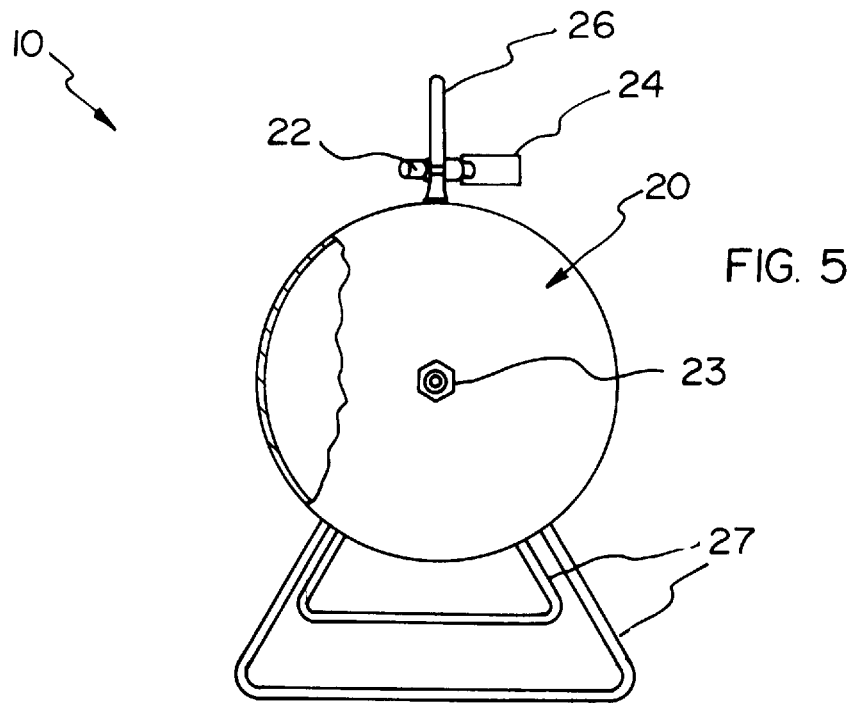
FIG. 5 is a cut away view of the conventional portable air tank and the pressure relief valve.
Figure 6:
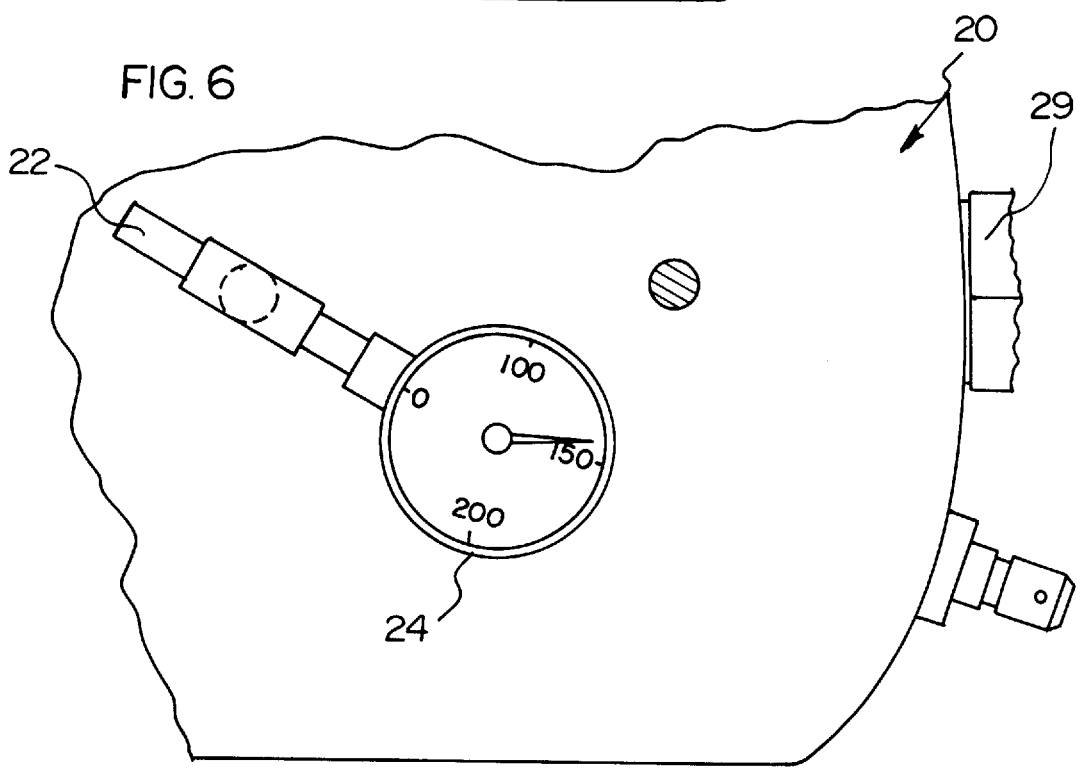
FIG. 6 is a cross sectional view taken along line 6—6 of FIG. 2 disclosing the pressure gauge interacting with the conventional portable air tank.

As best illustrated in FIGS. 1 through 6, it can be shown that the conventional portable air tank 20 includes a conventional valve stem 25 secured to the upper exterior portion of the conventional portable air tank 20, a pressure relief valve 22 secured to a pressure gauge 24, located below and extending outwardly from a handle 26 which is secured to the top exterior surface. An auxiliary coupler 28 is connected to the lower portion of the end of the conventional portable air tank 20 opposite of an air inlet coupler 23. Two legs 27 are secured to the lower exterior surface of the conventional portable air tank 20. The auxiliary coupler 28 removably couples with a conventional air hose 12. A tank coupler 29 is connected centrally to the same end of the conventional portable air tank 20 as the auxiliary coupler 28 as best shown in FIG. 2 of the drawings. An air inlet coupler 23 is secured to the conventional portable air tank 20. The air releasing means 30 includes a release valve 32 connected to the tank coupler 29 opposite of the conventional portable air tank 20. The release valve 32 is able to release a high volume of air in a finite period of time when the conventional portable air tank 20 is pressurized at 100 to 150 PSI. A release lever 34 is mechanically connected to the release valve 32 to open and close the release valve 32 thereby releasing the high volume of air. A planar air outlet port 36 is connected to the release valve 32 opposite of the tank coupler 29 as best shown in FIG. 4 of the drawings. The planar air outlet port 36 is substantially V-shaped and projects from the release valve 32 towards the ground at a predetermined angle. The planar air outlet port 36 is further flattened so as to project between a tire 16 and a rim 14 before inflation of the tire 16 as best shown in FIG. 4 of the drawings. The planar air outlet port 36 is able to be retracted from the tire and rim 14 upon inflation of the tire 16 in relation to the rim 14.

In use, the user pressurized the air within the conventional portable air tank 20 to approximately 140 PSI. The user then places the planar air outlet port 36 between the tire 16 and the rim 14. The user then grasps the release lever 34 which opens the release valve 32 thereby release a large quantity of air through the planar air outlet port 36 into the tire 16. The tire 16 is thereby expanded by the large quantity of air whereby the side walls of the tire 16 engage the rim 14. The user then retracts the planar air outlet port 36 from between the tire 16 and rim 14 leaving the tire 16 sealed against the rim 14. The user then may fully inflate the tire using a conventional air hose 12 removably secured to a valve stem 18.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling with the scope of the invention.

What is claimed as being new and desired to be protected by Letters Patent of the United States is as follows:

1. A Portable Tubeless Tire Inflating System comprising:
    a portable air tank; and an air releasing means;

wherein the portable air tank has a tubular central extent and a pair of circular end faces, the portable air tank including a valve stem secured to an upper portion of the central extent of the portable air tank, a pressure relief valve secured to a pressure gauge of the portable air tank, the pressure gauge secured to the upper portion of the central extent of the portable air tank and facing upwards, a handle secured to the upper portion of the central extent of the portable air tank and extending along a length of the portable air tank where the pressure gauge is mounted to the portable air tank beneath the handle and extends outwardly therefrom for facilitating viewing of the same, at least two legs secured to a lower exterior surface of the portable air tank, an auxiliary coupler connected to a lower portion of one of the end faces of the portable air tank, where the auxiliary coupler removably couples with an air hose coupler, an air inlet coupler connected to one of the end faces of the portable air tank, and a tank coupler connected centrally to one of the end faces of the portable air tank similar to that on which the auxiliary coupler is positioned and opposite from that on which the air inlet coupler is positioned;

wherein the air releasing means includes a release valve including an inboard extent connected to the tank coupler and extending therefrom in coaxial relationship therewith where the release valve is able to release a high volume of air in a finite period, a release lever mechanically connected to the release valve which extends outwardly and downwardly from the inboard extent where the lever is adapted to open and close the release valve, and a planar air outlet port connected to the outboard extent of release valve in coaxial relationship therewith, wherein the planar air outlet port is substantially V-shaped and projects from the release valve towards the ground at a predetermined angle and further resides in a vertical plane common with that in which the inboard extent and the outboard extent of the release valve reside, thereby allowing a tire to be filled with air while in an upright orientation.

\* \* \* \* \*